United States Patent [19]

Ogasawara

[11] Patent Number: 5,044,740
[45] Date of Patent: Sep. 3, 1991

[54] MIRROR ASSEMBLY

[75] Inventor: Morihiko Ogasawara, Aichi, Japan

[73] Assignee: Kabushiki Kaisha Tokai Rika Denki Seisakusho, Aichi, Japan

[21] Appl. No.: 524,235

[22] Filed: May 16, 1990

[30] Foreign Application Priority Data

May 19, 1989 [JP] Japan .............................. 1-58188[U]

[51] Int. Cl.$^5$ ......................... G02B 7/18; G02B 17/00
[52] U.S. Cl. ..................................... 359/603; 359/871
[58] Field of Search ............... 350/601, 631, 600, 602, 350/604, 618, 622, 628, 629, 631, 638, 607, 609, 276–278, 590

[56] References Cited

U.S. PATENT DOCUMENTS 4,740,066 4/1988 Whitehead .......................... 350/631

Primary Examiner—Bruce Y. Arnold
Assistant Examiner—James Phan

[57] ABSTRACT

A mirror assembly including a mirror and a mirror holder for holding the mirror from behind. The mirror has chamfers formed in the fore and back peripheral corners of the mirror. The foreside chamfer is so dimensioned that a light ray incident upon the mirror and reflected by a reflective film at its outer periphery (the border between it and the inward edge of the backside chamfer) toward the outer periphery side of the mirror is incident upon the foreside chamfer for preventing glare. The backside chamfer is so dimensioned that a light ray incident upon the mirror and reflected by its outer peripheral side face toward the reflective film side is incident upon the backside chamfer for preventing glare of the light ray incident upon the mirror, the portion directed toward the mirror's outer periphery side is incident upon either chamfer. Since these chamfers, formed by grinding, are opaque and ground glass-like, respectively, the light ray reflected outward thereby is soft and free of glare.

3 Claims, 3 Drawing Sheets

MIRROR ASSEMBLY

BACKGROUND OF THE INVENTION

1. Field of the Invention

The present invention generally relates to a mirror assembly, and more particularly it relates to a mirror assembly of the type comprising a mirror made by forming a reflective film on the backside of a transparent plate and a mirror holder having a base plate covering the backside of the mirror and an engaging edge portion engaging with the foreside peripheral portion of the mirror.

2. Description of the related art

Hitherto, a mirror has not generally been used as mirror itself but as a mirror assembly with the mirror combined with a mirror holder of various sizes and configurations suited for the intended use. An example thereof is a mirror assembly using a mirror holder of the aforementioned type and as a mirror in the form of such mirror assembly may be sighted an outside mirror unit such as a door mirror unit for an automobile.

With a mirror assembly of this type, however, it was often the case that glare or glaringness takes place in the peripheral portion of the mirror, this glare interfering with the appearance of the mirror. Hereinafter the glare of the door mirror unit will be explained in detail with reference to FIGS. 5 and 6 showing the essential parts thereof in section.

First, the composition of this door mirror unit will be outlined below. Generally, the door mirror unit is composed of a mirror 3, a mirror holder 5, a mirror case attached to the automobile's body (not shown). The mirror 3 has its peripheral portion held from behind by the mirror holder 5, and the mirror holder is set in the mirror case via a universal joint (not shown) so that the mirror's direction may be set arbitrarily. As a measure to prevent cracking of the mirror 3 when some external force is applied to e.g. the mirror holder, this mirror 3 has chamfers 6 and 8 formed in the fore and back peripheral corners thereof. Since these chamfers 6 and 8 are generally formed by grinding, the chamfered faces look like opaque ground glass. Meanwhile, for the outer peripheral side face 7 of the mirror 3 finishing by grinding is not proper for ensuring the required precision of the outer dimension, and leaving as cut (by diamond cutter) is preferred also from the viewpoint of reducing the number of processing steps. Hence, its peripheral side face has a slight roughness resulting from the cutting. The mirror 3 thus formed is set in the mirror case combined with the mirror holder 5 as mentioned above, but since this is done by first setting the mirror 3 in the heated and expanded mirror holder 5 (since it is normally made of a plastic) and then cooling to shrink the latter, it is impossible to make too large the extension of the engaging edge portion 4, which holds the mirror 3 from behind the foreside peripheral portion thereof, toward the mirror center.

Hence, as shown by an arrow in FIG. 5, rays of light incident upon the peripheral portion of the mirror 3 may possibly reach the outer peripheral side face. In such a case, since the outer peripheral side face 7 is rough as mentioned above, the light ray is reflected irregularly and the irregularly reflected light ray is further reflected by a reflective film 2 toward the driver's side to thereby cause glare. The figure shows the condition in which the incoming light ray at an incident angle of $\theta_1$ (60° in the figure) is refracted at a refractive angle $\theta_2$ (35° in the figure) by glass approx. 1.5 in refractive index. This incident angle is quite usual with the relationship between the door mirror unit and the driver's eye taken into account. The range of the incident angle $\theta_1$ at which the light ray can be incident upon the outer peripheral side face 7 of the mirror 3 actually varies according to the engaging allowance of the engaging edge portion 4 of the mirror holder 5 with respect to the mirror 3, the thickness of the mirror 3 and the like but here the above angle is given as an example.

Meanwhile, the glare in question can be prevented by precluding the irregular reflection of light ray by the outer peripheral side face thus caused, but it is not preferable to finish here by grinding to make it like ground glass as mentioned above from the viewpoint of the number of processing steps. It is, therefore, conceivable that the glare can be prevented by reducing the width of the outer peripheral side face 7 which can possibly cause irregular reflection by somewhat enlarging the chamfer 8 on the backside as shown in FIG. 6 and by letting the refracted light ray being incident upon the ground glass-like chamfer 8. Even in such a case, however, it is essential that the outer peripheral side face 7 be spared to ensure the required precision of the outside dimensions, hence there is a limit for enlarging the chamfer 8 and, as shown by the imaginary line, the glaring reflected light ray from the outer peripheral side face 7 in the figure is re-reflected toward the reflective surface 2 so as to be cast forward with respect to the mirror 3, when the incident angle is $\theta_1'$ (75°) and the refractive angle is $\theta_2'$ (40°). In the cases as illustrated in FIGS. 5 and 6, too, glare may possibly be caused by progress of light ray in the reverse direction, that is, opposite to the direction indicated by the arrow.

SUMMARY OF THE INVENTION

The present invention has been made for effectively solving the technical problem as mentioned above.

Accordingly, an essential object of the present invention is to provide a mirror assembly capable of preventing irregular reflection of light ray even without grinding the outer peripheral side face of the mirror, that is, leaving it as cut.

In accomplishing this object, according to the present invention, there is provided a mirror assembly whose composition is as described below.

That is, the invention features that each chamfer formed in the corners of the mirror is of the following dimensions. Firstly, the chamfer formed on the foreside is so dimensioned that a light ray incident upon the mirror and reflected by the reflective film at its outer periphery (the border between it and the chamfer on the backside) is incident on the foreside chamfer for preventing glare. The chamfer formed on the backside, on the other side, is so dimensioned that the light ray incident upon the mirror from before and reflected by its outer periphery is incident on the backside chamfer for preventing glare.

In the mirror assembly of the aforementioned composition, of the light ray incident upon the mirror from before, the portion reflected by the reflective film at its periphery is then incident upon the chamfer on the foreside. Since this chamfer is formed by grinding and opaque ground glass-like, there is no possibility of the light ray reflected thereby being glaring to the driver et al. When the light ray is reflected at a position inward of the outer periphery of the reflective film on the backside of the mirror at the same reflection angle as in the case of reflection at the outer periphery, and when it is imagined that the width of the outer peripheral side face of the mirror is extended, the position the reflected light ray is incident upon the imaginary outer peripheral side face of the mirror is ahead of the incident position of the light ray reflected by the reflective film at its outer periphery. Hence, there is no likelihood of the reflected light ray being incident upon the mirror's outer peripheral side face behind the foreside chamfer and, therefore, there is no fear of glare caused by the light ray in this direction.

Then, of the light ray incident upon the mirror, the portion reflected by the outer peripheral side face of the mirror toward the reflective film side is then incident upon the chamfer formed on the backside. Since this chamfer, too, is formed by grinding and opaque ground glass-like, there is no likelihood of the light ray reflected here being glaring to the driver et al.

Thus, according to the aforementioned composition, each chamfer is so dimensioned that the light ray reflected by the reflective film toward the outer peripheral side of the mirror and, conversely, that reflected by the outer peripheral side face of the mirror toward the reflective film side are both incident thereupon, hence the occurrence of glare giving an unpleasant impression to the driver et al. can be prevented without increasing the number of processing steps or the like.

BRIEF DESCRIPTION OF THE DRAWINGS

This and other objects and features for the present invention will become apparent from the following description taken in conjunction with the preferred embodiment thereof with reference to the accompanying drawings, in which.

DETAILED DESCRIPTION OF THE INVENTION

Figure 1:
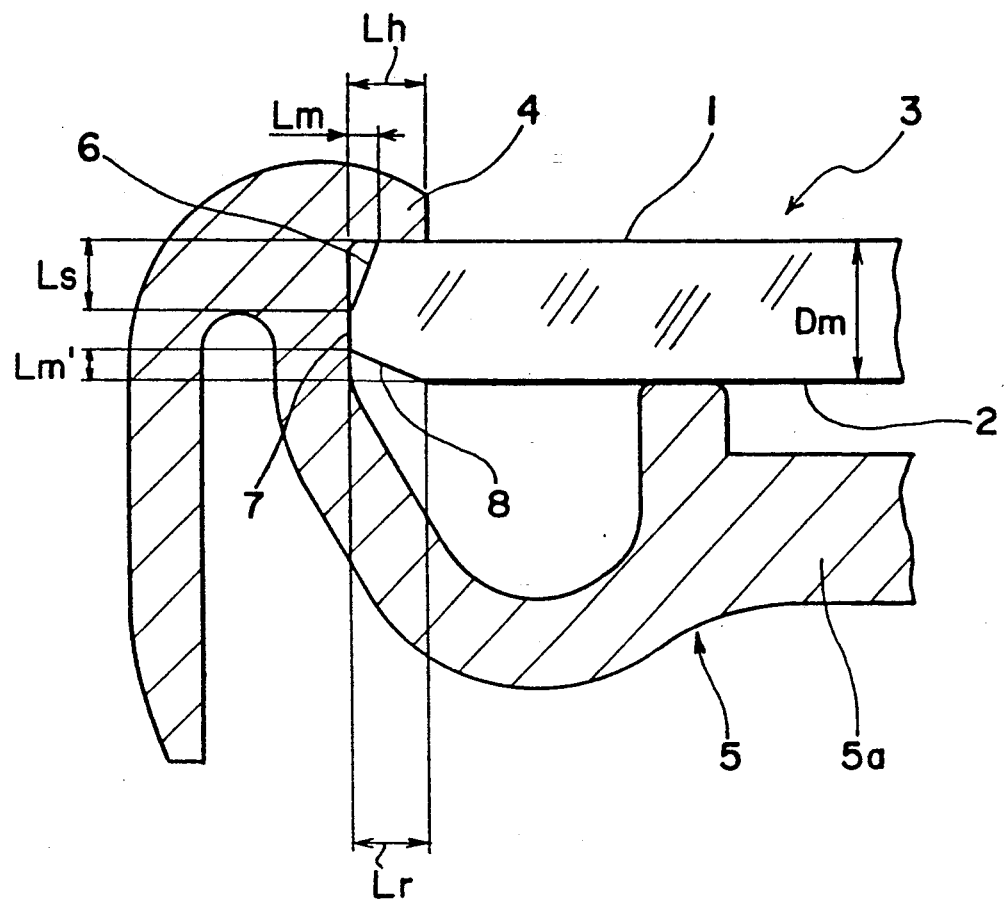
FIG. 1 is a sectional view showing the essential parts of a mirror assembly for use in a vehicle's door mirror unit according to one embodiment of the present invention.

Before the description of the present invention proceeds, it is to be noted that like parts are designated by like reference numerals throughout the accompanying drawings.

One embodiment of the present invention will be described below in detail in conjunction with FIGS. 1 and 2.

Referring to FIG. 1, the mirror assembly shown comprises a mirror 3 and a mirror holder 5. The mirror 3 is composed of a plate glass 1 and a reflective film 2 formed on the backside thereof by chromium plating or the like. The mirror holder 5 is basically made up of a base plate 5a covering roughly all over the backside of the mirror 3 and an engaging part or engaging edge portion 4 formed monobloc with the base plate 5a to embrace the periphery of the mirror 3 and extend to the foreside peripheral portion thereof. The mirror assembly of this composition is set in a case of a door mirror unit attached to the door of a vehicle via a universal joint to be freely rotatable.

Outer peripheral side face 7 of the mirror 3 is as cut by diamond cutter and has some roughness. There is provided in the fore and back corner parts chamfers 6 and 8 formed by grinding and capable of absorbing irregularly reflected light ray. The dimensions of these chamfers 6 and 8 will now be described. The symbols in FIGS. 1 and 2 show the following dimensions respectively.

$\theta_1$ : Incident angle
$\theta_2$ : Refractive angle
Dm : Mirror's thickness
Lh : Engaging allowance of the engaging part 4 of the mirror holder
Ls : Perpendicular dimension of the foreside chamfer 6
Lr : Planar dimension of the backside chamfer 8
Lm : Planar dimension of the foreside chamfer 6 and
$Lm^1$ : perpendicular dimension of the backside chamfer 8

As to Dm and Lh, various settings are feasible and the relationship between $\theta_1$ and $\theta_2$ may vary depending on the material's refractive index (refractive index is obtainable by the known formula of $n = \sin\theta_1 / \sin\theta_2$) but in the following explanation with reference to FIGS. 1-4, Dm is set at 1.9 mm, Lh at 1 mm and the glass used is one with a refractive index of 1.519. For a better understanding of the embodiment of the present invention shown in FIGS. 1 and 2, first explanation will be made with reference to FIGS. 3 and 4. In these illustrative views, the chamfer dimensions Ls, Lr, $Lm^1$ and Lm are equal, all being 0.4 mm. Although in FIGS. 3 and 4 no engaging allowance Lh is shown, the explanation given below is applicable also where such allowance, Lh, is taken into consideration. The figure shows the case where the refractive angle $\theta_2$ is theoretically maximum, that is, where the incident angle $\theta_1$ is infinitely close to 90°. In this case, assuming that in FIG. 3 the light ray is incident upon the foreside of glass at the outer periphery "a", the refractive angle $\theta_2$ is 41.17°, and the light ray is reflected by the outer peripheral side face 7 to be incident upon the reflective film at the position $l_1 = 1.26$ mm, more than Lh ($= 1$ mm), inward of this peripheral side face. That is, the incident point "b" of the light ray reflected by the film 2 is nearer to the glass center than the incident point "a" on the foreside of glass. This means that in this case the glaring light ray reflected by the outer peripheral side face is re-reflected by the reflective film 2 past the dimensions Lm and Ls of the foreside chamfer 6 are 0.4 mm, respectively, as mentioned above, it is essential to increase the dimension Lr of the backside chamfer 8 to be not less than 1.26 mm so that the light ray reflected by the outer peripheral side face 7 is incident upon the chamfer 8. In this case, therefore, the dimension Lr of the chamfer 8 is more than the dimension Lh($= 1$ mm). The planar dimension Lr of the chamfer 8 being more than the dimension Lh is, however, not preferable for it means decrease of the effective area of the mirror surface.

Now, the dimension Lr' of the backside chamfer may be made approximately equal to Lh$= 1$ mm. (The chamfer 8 so dimensioned is indicated by the broken line in FIG. 4.) As shown by the arrow in FIG. 4, if it is imagined that the incident light ray with the angle $\theta_1$ infinitely close to 90° is reflected by the reflective film at its outer periphery, the reflected light ray is incident upon the outer peripheral side face 7 at the position $l_2$ ($=0.76$ mm) off the surface of the glass plate. Hence, in order to prevent glaring here, the dimension Ls is required to be more than $l_2$ (0.76 mm). (The chamfer so dimensioned is shown by the broken line in FIG. 4.) The required relation is as follows.

$$Ls \geq l_2 \qquad (1)$$
$$\geq Dm - \{Lr \times \tan(90° - \theta_2)\}$$
$$\geq Dm - Lr \times \cot \theta_2$$

Figure 2:
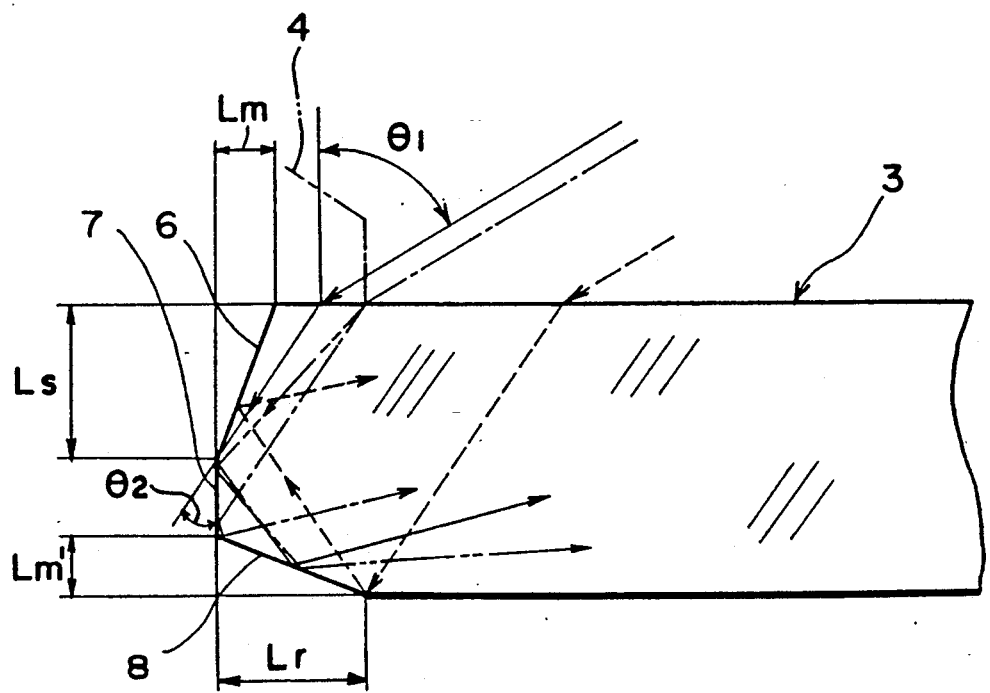
FIG. 2 is an illustrative view showing the light ray reflecting condition.
Figure 3:
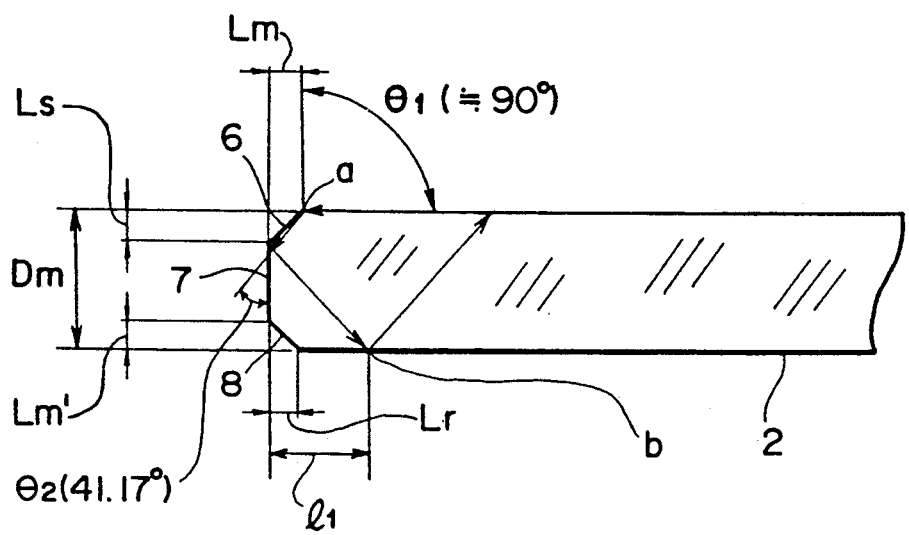
FIGS. 3 and 4 are illustrative views for facilitating understanding of the aforementioned embodiment.
Figure 4:
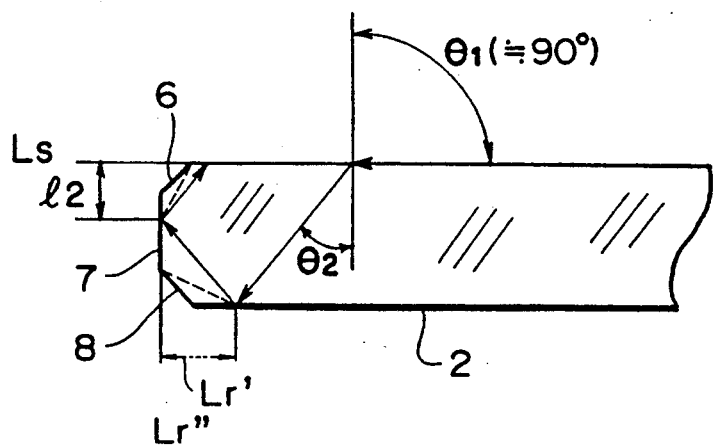
Figure 5:
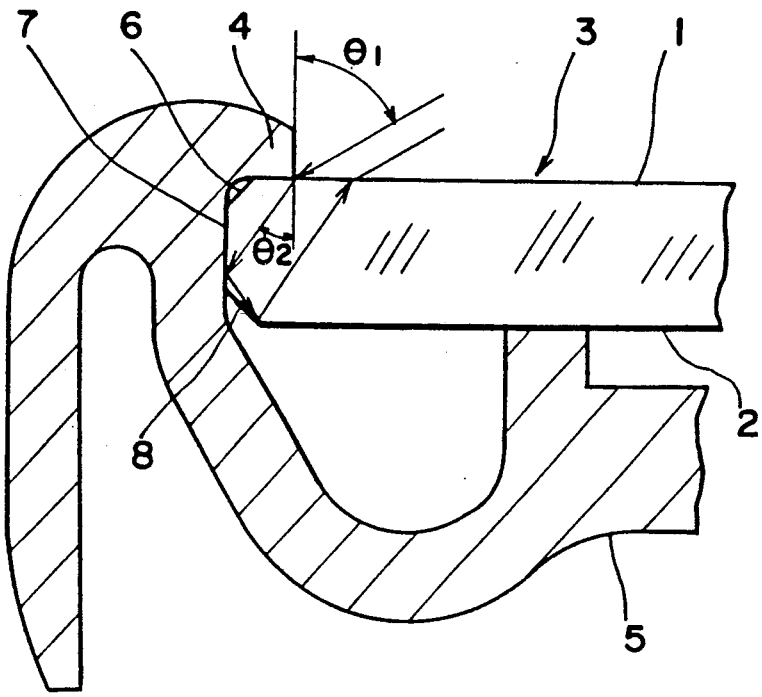
FIGS. 5 and 6 are sectional views, as previously described in the BACKGROUND OF THE INVENTION, showing the essential parts of a conventional mirror assembly.
Figure 6:
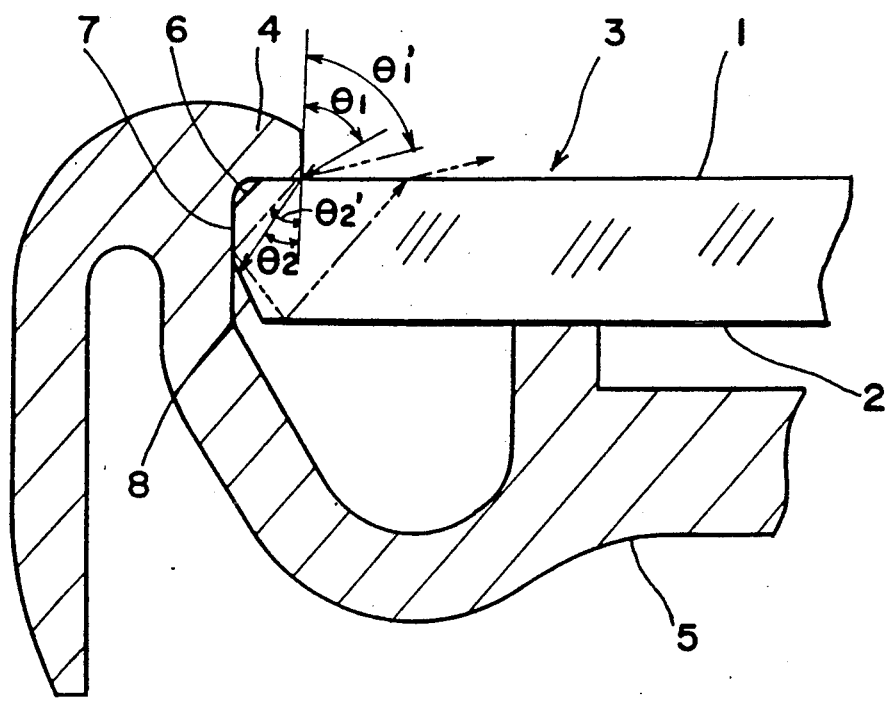

In the embodiment shown in FIGS. 1 and 2 the dimension Ls is made 1 mm with the manufacturing error of Dm or the like taken into consideration.

To ensure against reflection by the reflective film 2 of the light ray first reflected by the outer peripheral side face 7 under the condition in which Ls is determined by the formula (1) above, the dimension Lr″ of the chamfer on the backside is only required to be $$Lr'' \geq (Dm - Ls) \tan \theta_2 \qquad (2)$$

This means that in this embodiment, assuming that Ls = 1 mm, this dimension is only required to be not less than 0.78 mm. As to Lr, this Lr″ may be compared with Lr′, and if
Lr′ ≧ Lr″,
Lr ≧ Lr′ will suffice, and if
Lr′ ≧ Lr″,
L Lr ≧ Lr″ will be sufficient. In this embodiment Lr is only required to be equal to Lr′ = 1 mm.

If Ls and Lr are determined to satisfy the formulae (1) and (2), Lm may be of any value. In this embodiment the value selected was 0.4 mm.

When the dimensions of the chamfer 8 can be increased, the dimension Lr of the chamfer 8 may be determined to satisfy the formula $$Lr \geq (Dm - Lm) \tan \theta_2$$

Referring to FIG. 2, in the door mirror unit so arranged that the dimensions of the chamfers satisfy the aforementioned relations, of the light ray incident from before, the portion reflected by the reflective film 2 at its outer periphery, the position inward of the outer peripheral side face 7 by the dimension Lr, toward the outer peripheral side face 7 side (indicated in FIG. 2 by the broken line) is incident upon the foreside chamfer 6 even when the reflection angle is largest. (In the figure $\theta_1$ is shown as, for example, 60°.) Hence, there is no possibility of the light ray reflected by the reflective film 2 at a position inward of its outer periphery or that reflected at its outer periphery at a smaller reflection angle being incident upon the outer peripheral side face 7.

Meanwhile, the light ray incident upon the mirror from before and reflected by the outer peripheral side face 7 toward the reflective film 2 side (indicated by the solid line) is bound to be incident upon the backside chamfer 8 even if it is reflected at the foremost end of the outer peripheral side face 7. The figure shows a case where $\theta_1$ is 60°, but it is apparent from the aforementioned dimensional arrangement that even light ray with a larger incident angle is bound to be incident upon this chamfer 8. The light ray incident position in the surface of the mirror 3 as indicated by the solid line arrow in FIG. 2 is the position where light ray cannot be incident in this embodiment as seen from the mirror holder's engaging part 4 indicated by the imaginary line. Since the actual light ray incident position is inward thereof as indicated by the alternate long and short dash line, the reflection position in the outer peripheral side face 7 moves toward the backside of the mirror 3 if the incident angle $\theta_1$ remains the same, and the reflected light ray is naturally incident upon the backside chamfer 8. Even if the light ray is incident at this position at an angle infinitely close to 90°, this light ray is eventually incident upon the chamfer on the backside as indicated by the two-dot chain line. Hence, even if the incoming light ray is at a less incident angle to be reflected by the outer peripheral side face 7, the reflected light ray is bound to be incident upon the chamfer 8 on the backside.

As explained above, the aforementioned composition does not cause any increase of the number of mirror processing steps and, moreover, even if the light ray should be reflected by the outer peripheral side face of the mirror, the reflected light ray is not directed unmodified at the driver's eyes, this resulting in absence of glare in the peripheral side face of the mirror.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A mirror assembly comprising a mirror having a foreside and a backside, a transparent plate and a reflective film formed on the backside thereof, said transparent plate provided with an outer peripheral side face, and a mirror holder having a base plate covering the backside of said mirror and an engaging edge portion formed to extend from a periphery of said base plate and to reach inward of a periphery of the foreside of said mirror, wherein a ground glass-like chamfer is formed by grinding at each of the fore and back peripheral corners of said mirror within the range of engagement with the engaging edge portion of said mirror holder to form a foreside chamfer and a backside chamfer, respectively, said foreside chamfer formed in said mirror is so dimensioned that a light ray incident upon said mirror and reflected by said reflective film at its outer periphery toward an outer periphery of said mirror is incident upon said foreside chamfer for preventing glare, and said backside chamfer formed in said mirror is so dimensioned that a light ray incident upon said mirror and reflected by said outer peripheral side face toward said reflective film side is incident upon said backside chamfer for preventing glare.

2. The mirror assembly according to claim 1, wherein said mirror assembly is one for use in an automobile outside mirror unit.

3. The mirror assembly according to claim 1, wherein the outer peripheral side face of said mirror is an as-cut face substantially at right angle to the foreside and the backside of said transparent plate and having a degree of roughness.

* * * * *